United States Patent
Ehrbar et al.

(10) Patent No.: US 9,758,331 B2
(45) Date of Patent: Sep. 12, 2017

(54) METHOD AND APPARATUS FOR HOLDING DOWN A SHEET ON A FEED TABLE OF A SHEET-PROCESSING MACHINE

(71) Applicant: HEIDELBERGER DRUCKMASCHINEN AG, Heidelberg (DE)

(72) Inventors: David Ehrbar, Walldorf (DE); Andreas Mueller, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 285 days.

(21) Appl. No.: 14/628,638

(22) Filed: Feb. 23, 2015

(65) Prior Publication Data
US 2015/0241875 A1 Aug. 27, 2015

(30) Foreign Application Priority Data

Feb. 21, 2014 (DE) .................. 10 2014 002 468

(51) Int. Cl.
*B65H 31/26* (2006.01)
*B65H 11/00* (2006.01)
(Continued)

(52) U.S. Cl.
CPC ............ *B65H 11/00* (2013.01); *B65H 3/122* (2013.01); *B65H 3/66* (2013.01); *B65H 5/36* (2013.01); *B65H 11/007* (2013.01); *G05B 19/41865* (2013.01); *B65H 2301/51256* (2013.01); *B65H 2403/514* (2013.01);
(Continued)

(58) Field of Classification Search
CPC ..... B65H 11/00; B65H 11/002; B65H 11/005; B65H 11/007; B65H 11/02; B65H 3/122; B65H 3/66; B65H 5/10; B65H 5/36; B65H 2402/46; B65H 2301/51256; B65H 2403/514; B65H 2403/532; B65H 2403/5321; B65H 2403/5311; B65H 2405/00; B65H 2405/10; B65H 2406/30; B65H 2406/31; B65H 2406/321; B65H 2406/351; B65H 2515/81; B65H 2557/242

See application file for complete search history.

(56) References Cited

U.S. PATENT DOCUMENTS 4,335,954 A * 6/1982 Phelps .................. B65H 9/106
271/236
4,753,433 A * 6/1988 Rodi ...................... B65H 5/24
271/151

(Continued)

FOREIGN PATENT DOCUMENTS

DE 4028426 C2 4/1998
DE 10246297 A1 4/2004
(Continued)

*Primary Examiner* — Prasad Gokhale
(74) *Attorney, Agent, or Firm* — Laurence A. Greenberg; Werner H. Stemer; Ralph E. Locher

(57) ABSTRACT

A method and an apparatus for holding down a sheet on a feed table of a sheet-processing machine include a lowerable smoothing bar which can be driven according to a speed profile in time with the sheet-processing machine, which results in a targeted deflection of the smoothing bar. The deflection is preserved for the purpose of smoothing the sheet from the middle to the side.

14 Claims, 4 Drawing Sheets

(51) Int. Cl.
    *B65H 3/12*           (2006.01)
    *B65H 3/66*           (2006.01)
    *G05B 19/418*       (2006.01)
    *B65H 5/36*           (2006.01)

(52) U.S. Cl.
    CPC ........... *B65H 2403/5311* (2013.01); *B65H 2403/5321* (2013.01); *B65H 2406/351* (2013.01); *B65H 2515/50* (2013.01); *B65H 2515/81* (2013.01); *B65H 2557/242* (2013.01); *B65H 2801/42* (2013.01); *G05B 2219/40054* (2013.01)

(56) References Cited

U.S. PATENT DOCUMENTS

| | | | | |
|---|---|---|---|---|
| 4,831,419 | A * | 5/1989 | Iaia, Jr. | B65H 5/224 271/197 |
| 5,202,737 | A * | 4/1993 | Hollar | B65H 5/062 162/271 |
| 2003/0038420 | A1* | 2/2003 | Cleary | B41J 11/007 271/197 |
| 2011/0094684 | A1* | 4/2011 | Ohsawa | B41F 7/06 156/367 |
| 2015/0239263 | A1* | 8/2015 | Ishizuka | B41J 3/4078 347/16 |

FOREIGN PATENT DOCUMENTS

| | | |
|---|---|---|
| DE | 10344402 A1 | 4/2004 |
| DE | 202007012349 U1 | 12/2007 |
| EP | 1681253 A1 | 7/2006 |

\* cited by examiner

METHOD AND APPARATUS FOR HOLDING DOWN A SHEET ON A FEED TABLE OF A SHEET-PROCESSING MACHINE

CROSS-REFERENCE TO RELATED APPLICATION

This application claims the priority, under 35 U.S.C. §119, of German Patent Application DE 10 2014 002 468.7, filed Feb. 21, 2014; the prior application is herewith incorporated by reference in its entirety.

BACKGROUND OF THE INVENTION

Field of the Invention

The invention relates to a method and an apparatus for holding down a sheet on a feed table of a sheet-processing machine, in particular a punch or a printing press.

The invention is based on overcoming the problem that sheets, in particular thin sheets, tend to form curves or undulations at their front edges which can lead to tensions or crease formation of the sheet at its front edge during further transport of the sheet by way of downstream gripper systems.

German Patent DE 4028426 C2 discloses an apparatus for smoothing a front edge of a sheet before being transported by downstream gripper devices. In that case, the front edge of the sheet is suctioned fixedly to the feed table by using fixing nozzles and is pressed against the feed table and therefore clamped by using clamping rollers.

SUMMARY OF THE INVENTION

It is accordingly an object of the invention to provide a method and an apparatus for holding down a sheet on a feed table of a sheet-processing machine, which overcome the hereinafore-mentioned disadvantages of the heretofore-known methods and apparatuses of this general type and in which the sheet is not clamped in.

With the foregoing and other objects in view there is provided, in accordance with the invention, a method for holding down a sheet on a feed table of a sheet-processing machine, which comprises placing a smoothing bar above the feed table, lowering the smoothing bar in a direction of the feed table, and carrying out the lowering movement of the smoothing bar according to a predefinable speed profile.

With the objects of the invention in view, there is also provided an apparatus for holding down a sheet on a feed table of a sheet-processing machine, comprising a smoothing bar disposed above the sheet and being lowerable in a direction of the feed table, the smoothing bar being mounted in such a way that it can be moved vertically on both sides of the feed table in time with the sheet-processing machine.

It is one special advantage of the invention that a smoothing bar is provided which smoothes the sheet without clamping it. This measure ensures that a surface of the sheet is not damaged. The sheet is smoothed uniformly toward the sides and fold formation is therefore avoided by using a special smoothing movement of the smoothing bar, namely from the middle to the sides of the sheet.

In accordance with another feature of the invention, in order to produce the smoothing movement of the smoothing bar, a drive, in particular an electric motor, is provided which can be driven in time with the sheet-processing machine and is controlled by using characteristic curves.

In accordance with a further feature of the invention, a four-bar linkage is provided which connects the drive to the smoothing bar.

As a result of the smoothing bar according to the invention, all grammages can be processed reliably without leaving markings on the sheet, in order to ensure that the sheet can be gripped without folds by gripping devices.

In accordance with a concomitant special feature of the invention, all grammages can be processed reliably without markings being produced on the sheet. Non-tensioned sheets secure a double-free print result and high register accuracy in printing presses.

Other features which are considered as characteristic for the invention are set forth in the appended claims.

Although the invention is illustrated and described herein as embodied in a method and an apparatus for holding down a sheet on a feed table of a sheet-processing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
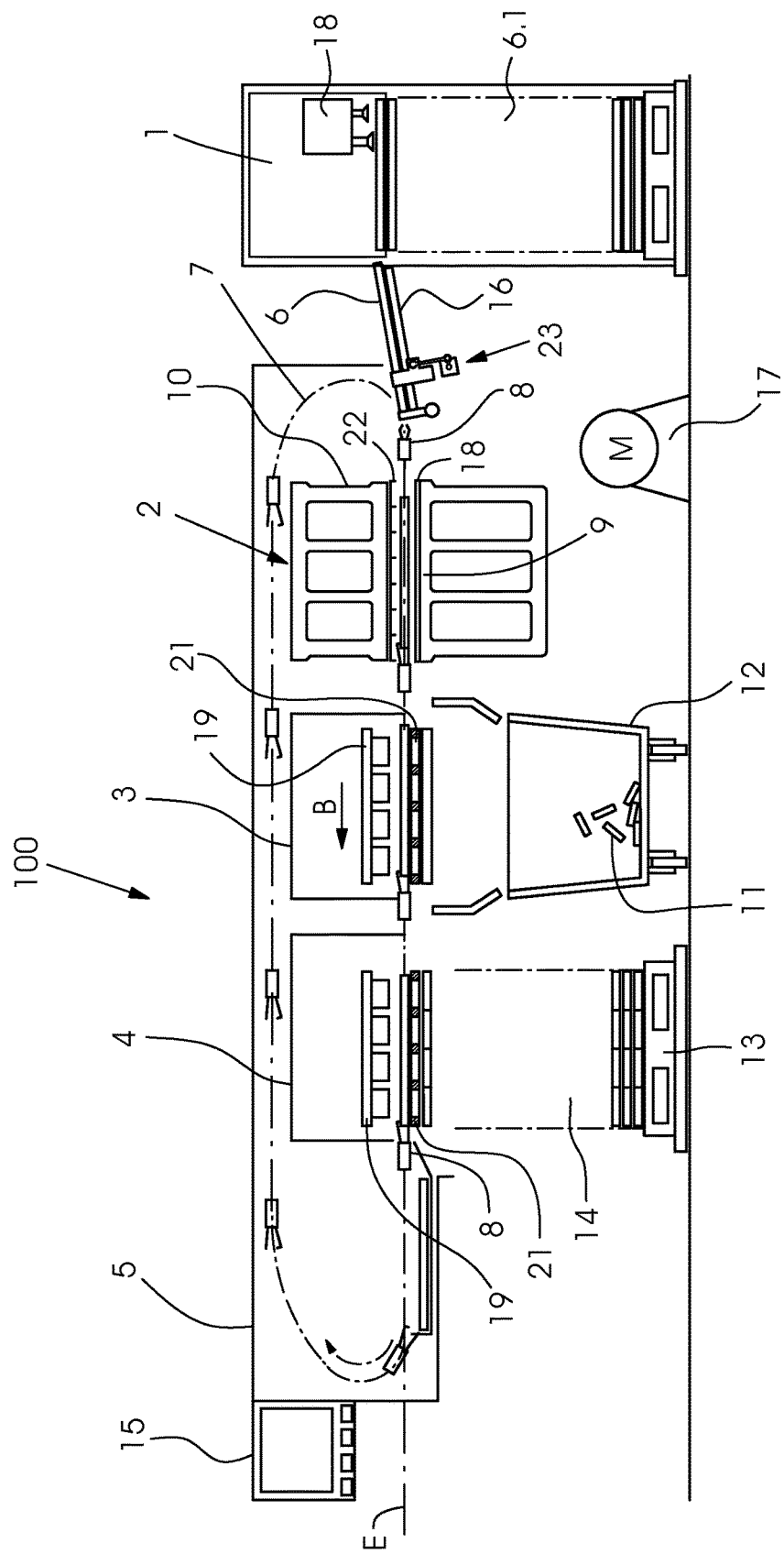
FIG. 1 is a diagrammatic, longitudinal-sectional view of a sheet punching and embossing machine for sheet-shaped material.

Referring now to the figures of the drawings in detail and first, particularly, to FIG. 1 thereof, there is seen a fundamental construction of a sheet punching and embossing machine 100 for punching, breaking out, separating multiple copies and depositing sheets made from paper, cardboard, plastic and the like. The punching and embossing machine 100 has a feeder 1, a punching station 2, a breaking-out station 3 and a delivery 4 with a station for depositing and separating multiple copies, which are supported and enclosed by a common machine housing 5 and driven by a main drive 17. The processing stations 2, 3, 4 are accessible from one side, the so-called operator side. The drive train of the sheet punching and embossing machine 100 is situated on the opposite side, the so-called drive side. A machine controller 15 controls the sequences within the punching machine 100.

Sheets 6 are separated from a stack 6.1 by the feeder 1, are fed to a sheet transport system 7, are gripped at their front edge by grippers which are fastened to gripper bars of a gripper carriage 8, and are pulled intermittently through the different stations 2, 3 and 4 of the punching and embossing machine 100 in a sheet transport direction B.

The sheet transport system 7 has a plurality of gripper carriages 8, as result of which a plurality of sheets 6 can be processed at the same time in the different stations 2, 3 and 4. The gripper carriages 8 can be driven by a chain drive or, in an alternative embodiment, by way of an electromagnetic linear drive with linear motors, as described, for example, in German Utility Model DE 20 2007 012 349 U1.

The punching station 2 is formed of a lower platen, which is a so-called lower table 9, and an upper platen, which is a so-called upper table 10. The upper table 10 is mounted in such a way that it can be moved back and forth vertically and is provided with an upper die 22 with punching and scoring blades. The lower table 9 is mounted fixedly on the machine frame and is provided with a plate 18 corresponding to the punching and scoring blades. As an alternative, the upper table 10 can also be stationary and the lower table 9 can be movable. During embossing, embossing dies, in particular in the form of so-called embossing plates, are used instead of the punching and scoring dies.

The gripper carriage 8 transports the sheet 6 from the punching and embossing station 2 into the following breaking-out station 3 which is equipped with breaking-out dies 19, 21. In the breaking-out station 3, waste pieces 11 which are not required are ejected downward from the sheet 6 with the aid of the breaking-out dies 19, 21, as a result of which the waste pieces 11 fall into a carriage-like container 12 which is pushed in below the station.

The sheet 6 passes from the breaking-out station 3 into the delivery 4, where the sheet 6 is either merely simply deposited, or a separation of the individual multiple copies of a respective sheet 6 takes place at the same time. To this end, the delivery 4 has a die 19, 21 for separating multiple copies. The delivery 4 can also include a pallet 13, on which the individual sheets 6 or copies are stacked in the form of a stack 14, so that the pallet 13 with the sheet stack 14 can be moved away from the region of the punching and embossing machine 100 after a defined stack height has been reached. Auxiliary stack devices can be used, so that it is not necessary to stop the machine 100 during the stack change.

A sheet hold-down 23 is disposed at one end of a feed table 16, which is the end that faces the punching and/or embossing stations 2 to 4.

Figure 2:
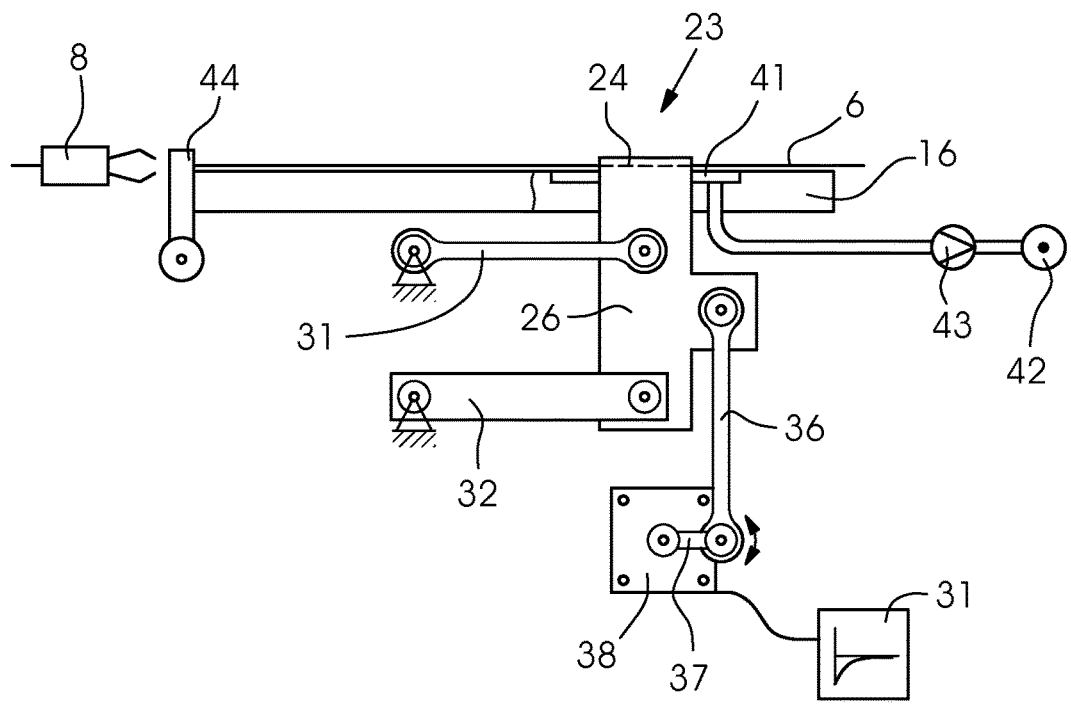
FIG. 2 is a side-elevational view of a sheet hold-down according to the invention.
Figure 3:
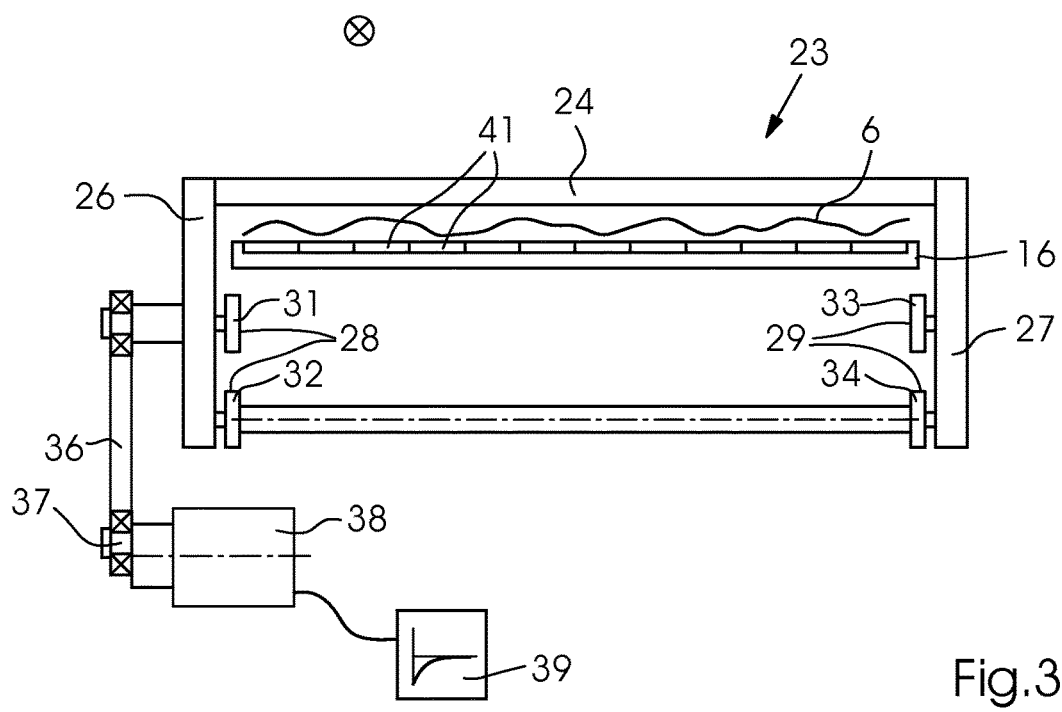
FIG. 3 is a front-elevational view of the hold-down as viewed counter to a sheet transport direction.
Figure 5:
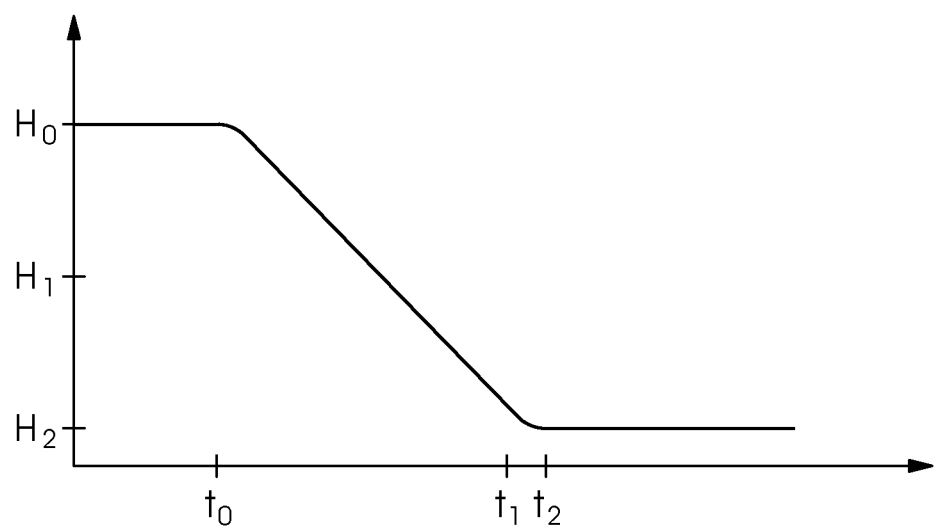
FIG. 5 is a diagram illustrating actuation of an electric motor.

As is seen in FIGS. 2 and 3, the hold-down 23 substantially has a smoothing bar 24 which is disposed above the feed table 16 transversely with respect to the sheet transport direction and can be lowered in time with the sheet-processing machine, for example a sheet-fed printing press, in particular a punch, in the direction of the feed table 16 from a position $H_0$ above the feed table 16 into a position $H_2$, as seen in FIG. 5. The smoothing bar 24 is fastened to couplers 26, 27 which are disposed on the sides of the feed table 16 and are in each case part of a four-bar linkage 28, 29. Moreover, each four-bar linkage 28, 29 has two bearing levers 31, 32; 33, 34 which are disposed horizontally parallel to one another. They are mounted pivotably and have a first end disposed in a stationary manner on a side frame of the feed table 16 and a second end disposed in each case on a respective coupler 26; 27.

The coupler 26 has a third lever 36 which has a first end mounted on the coupler 26 in an articulated manner and a second end connected to an eccentric 37 which is driven rotationally by a motor 38. The motor 38 is driven in time with the sheet-processing machine, for example the punching and embossing machine 100, according to an adjustable speed profile 39.

The speed profile 39 is configured in such a way that immediately before the end position of the lowering movement $H_2$ is reached, the middle of the smoothing bar 24 overshoots just enough (over-shooter) that the middle of the smoothing bar 24 reaches its end position before the ends of the smoothing bar 24 reach their end position. The oscillation of the smoothing bar 24 decays or is stopped after one overshoot of the bar middle, with the result that the oscillation of the smoothing bar 24 is stopped virtually completely when the end position of the ends of the smoothing bar 24 is assumed.

The smoothing bar 24 performs precisely one oscillation of a first resonant frequency. As an alternative, the smoothing bar 24 can perform a plurality of periods of the oscillation of the first resonant frequency.

The smoothing bar 24 is preferably excited to perform the oscillation of the first resonant frequency from a rest position or during the lowering movement by harmonic excitation, which oscillation decays by way of material damping or deliberate damping through the drive, while the smoothing bar 24 is moved into its end position $H_2$.

A superimposition of the excitation of a plurality of resonant frequencies of the smoothing bar 24 is achieved during a first contact of the smoothing bar 24 with the sheet by way of a geometry of the smoothing bar 24 which differs from the first resonant frequency.

The feed table 16 has a number of suction openings 41 below the smoothing bar 24 for fixing a sheet 6. The suction openings 41 can be charged or loaded with vacuum from a vacuum generator 42 and can be adjusted by using a throttle 43 in time with the sheet-processing machine.

A sheet 6 which is conveyed over the feed table 16 is aligned on front lays 44 and is stopped. As soon as the sheet 6 stops, the smoothing bar 24 is moved downward. The vacuum is switched on at the same time as the downward movement of the smoothing bar 24, preferably at its low point $H_2$. The smoothing bar 24 therefore ensures that an air gap under the sheet 6 is small enough that the suction openings 41 can reliably attract the sheet 6 by suction. The stroke and therefore the minimum spacing of the gap between the dead center position $H_2$ of the smoothing bar 24 and the feed table 16 are adjustable, so that sheets 6 of different thickness can be reliably attracted by suction.

Figure 4A:
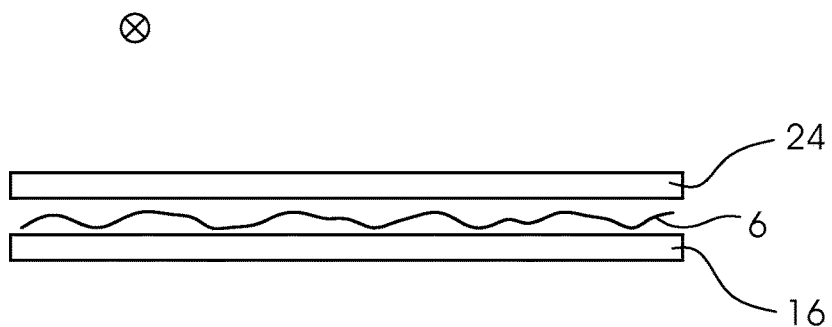
FIGS. 4A, 4B and 4C show the hold-down in various positions during a smoothing operation.
Figure 4B:
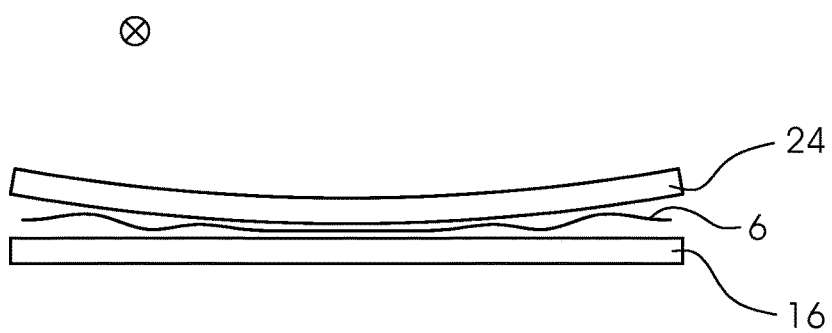
Figure 4C:
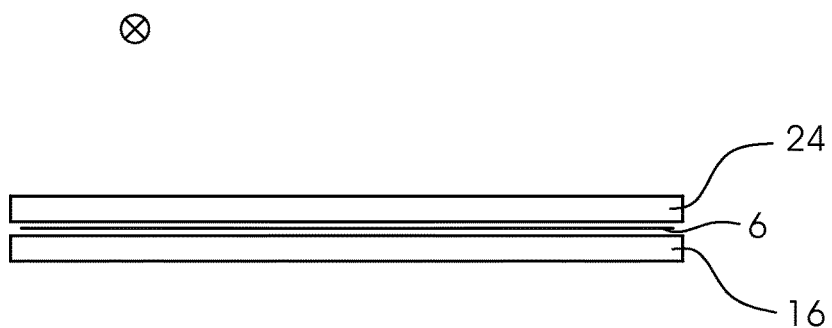

In order to ensure that the attraction of the sheets by suction takes place without folds, the smoothing bar 24 has an oscillatory structure, that is to say it deflects noticeably during the downward movement. The smoothing bar 24 is excited to produce an oscillation in a targeted manner by the drive 38, which oscillation is superimposed on a kinematic movement in time with the sheet-processing machine and causes the middle of the bar to first reach the lowest point $H_2$ above the sheet 6 and shortly thereafter for the ends of the smoothing bar 26 to also likewise assume that position (FIGS. 4A to 4c).

The temporal sequence is coordinated in such a way that a first jump $t_0$ according to FIG. 5 takes place at half a period duration of the first resonant frequency of the smoothing bar 24 before the start of a suction action $t_1$ of the suction openings 41, with the result that the middle of the smoothing bar reaches the lower dead center $H_2$ of its oscillation at the same time as the start of the vacuum. At this time, a second jump then takes place which likewise lowers the ends of the smoothing bar 24 completely and at the same time stops the periodic resonant oscillation which results from the first jump, so that the smoothing bar 24 remains at rest in the lower position $H_2$ at a time $t_2$, that is to say the smoothing bar reaches its dead center.

In addition, it is proposed to charge or load the suction openings 41 with vacuum starting from the middle toward the sides, in order to improve a sliding sweeping effect toward the side.

The invention claimed is:

1. A method for holding down a sheet on a feed table of a sheet-processing machine, the method comprising the following steps:
   placing a smoothing bar with a middle and ends above the feed table;
   lowering the smoothing bar toward the feed table in a lowering movement, the lowering movement having a lowest position; and
   carrying out the lowering movement of the smoothing bar according to a predefinable speed profile;
   exciting the smoothing bar to carry out an oscillation being superimposed on a kinematic movement in time with the sheet-processing machine;
   configuring the speed profile so that, immediately before reaching the lowest position of the lowering movement, the middle of the smoothing bar overshoots just enough to cause the middle of the smoothing bar to reach a middle end position before the ends of the smoothing bar reach an end position of the ends.

2. The method according to claim 1, which further comprises configuring the speed profile to decay or stop the oscillation of the smoothing bar after the middle of the bar has overshot, causing the oscillation of the smoothing bar to be stopped substantially completely when the end position of the ends of the bar is reached.

3. The method according to claim 2, which further comprises causing the smoothing bar to perform precisely one oscillation of the first resonant frequency.

4. The method according to claim 3, which further comprises including an actuation in the speed profile at which the smoothing bar is accelerated from a rest position to a constant speed, and later braking one whole period duration of the first resonant frequency of the smoothing bar to a speed equal to zero.

5. The method according to claim 4, which further comprises switching on a suction effect using suction openings as soon as the middle of the smoothing bar has reached a predetermined height.

6. The method according to claim 2, which further comprises causing the smoothing bar to perform a plurality of periods of the oscillation of the first resonant frequency.

7. The method according to claim 6, which further comprises, in a rest position or during a downward movement of the smoothing bar, exciting the smoothing bar by harmonic excitation to an oscillation of the first resonant frequency decaying by way of material damping or deliberate damping using a drive, while the smoothing bar moves into its end position.

8. The method according to claim 1, which further comprises superimposing an excitation of a plurality of resonant frequencies of the smoothing bar during a first contact of the smoothing bar with a sheet, by using a geometry of the smoothing bar differing from a first natural mode.

9. An apparatus for holding down a sheet on a feed table of a sheet-processing machine, the apparatus comprising:
   a smoothing bar disposed above the sheet and configured to be lowered in a direction toward the feed table;
   a four-bar linkage receiving said smoothing bar; and
   said smoothing bar being mounted to permit movement of said smoothing bar vertically on both sides of the feed table in time with the sheet-processing machine.

10. The apparatus according to claim 9, which further comprises an eccentric driving said four-bar linkage.

11. The apparatus according to claim 10, which further comprises a motor being actuated by using characteristic curves for driving said eccentric.

12. The apparatus according to claim 9, which further comprises suction openings formed in the feed table.

13. The apparatus according to claim 12, wherein said suction openings can be charged with an adjustable vacuum in time with the sheet-processing machine.

14. The apparatus according to claim 9, wherein the sheet-processing machine is a punch or a printing press.

* * * * *